Patented July 11, 1939

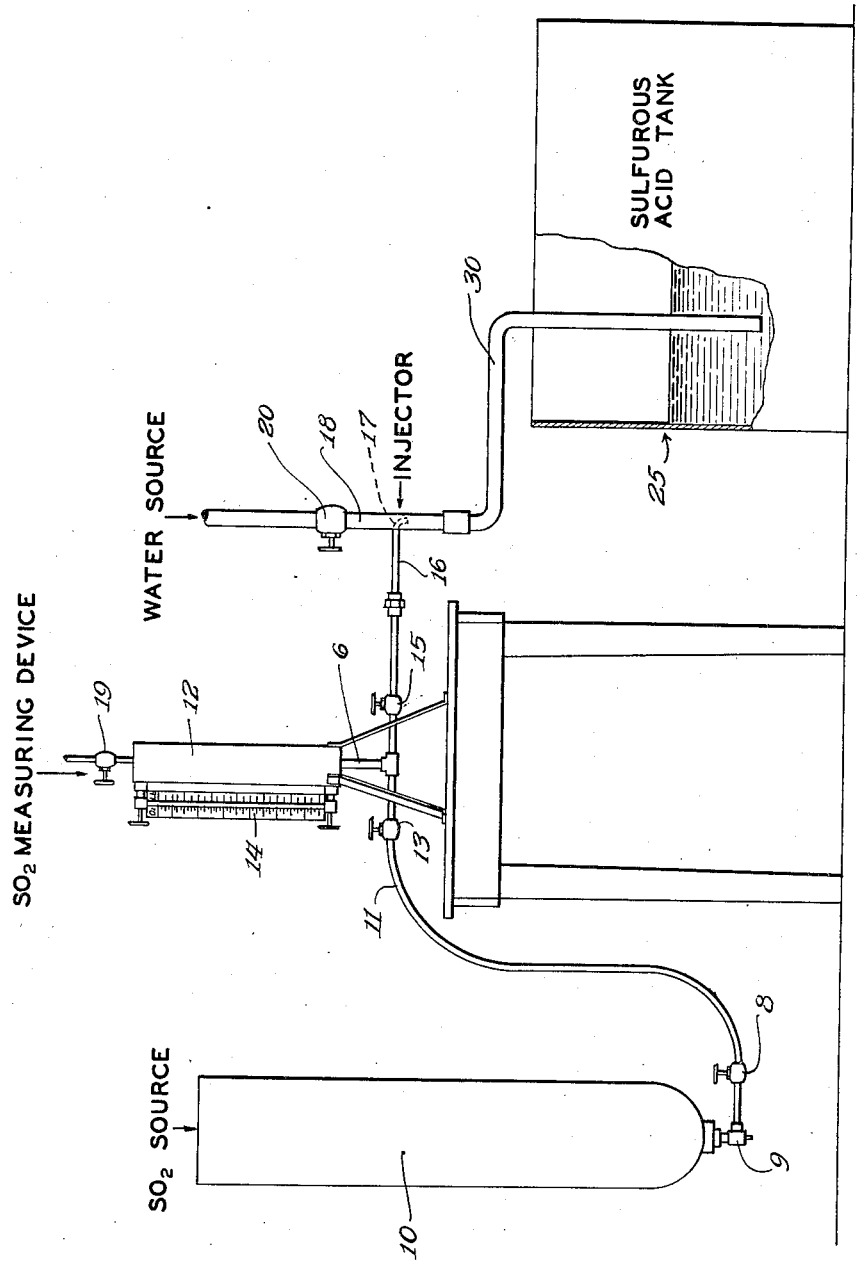

2,166,072

UNITED STATES PATENT OFFICE 2,166,072

PROCESS FOR TREATMENT OF LIQUIDS WITH SULPHUR DIOXIDE

Arthur C. Pope and Walter E. Pfleger, Marinette, Wis., assignors to Ansul Chemical Company, Marinette, Wis., a corporation of Wisconsin Application July 22, 1938, Serial No. 220,710

5 Claims. (Cl. 23—177)

This invention relates to a process and apparatus for the treatment of liquids with liquid sulphur dioxide. More particularly this invention relates to the production of solutions of sulphur dioxide from liquid sulphur dioxide.

Heretofore solutions of sulphur dioxide have been prepared by dissolving gaseous sulphur dioxide in a liquid. This procedure is very inefficient, time consuming and inconvenient. In preparing aqueous solutions of sulphur dioxide for bleaching fruits, for example, it is necessary to prepare large quantities of aqueous solutions of sulphur dioxide. The present methods in use are very cumbersome and wasteful requiring the use of wooden tanks, usually a series of two or three if any attempt is made to minimize gas losses. The procedure consists in injecting sulphur dioxide gas into the tanks filled with water and permitting the gas to be dissolved. Furthermore, when the sulphur dioxide is supplied in liquid form it is first necessary to vaporize the sulphur dioxide into gaseous form and to inject the gas very slowly in order to allow sufficient time for its absorption. This method is very inefficient since considerable gas is lost which is not absorbed even when the tanks are connected in series. Furthermore, after the sulphur dioxide is prepared in the tanks it is necessary to transfer the solution to containers with further loss of gas and discomfort to the operator. The apparatus necessary for producing the solution is furthermore not portable so that when solutions of sulphur dioxide are required in remote parts they have to be hauled in barrels with even more loss of gas and much added expense.

In order to obviate these disadvantages we have devised an apparatus and method which is simple, efficient and inexpensive. The apparatus is portable and can be taken wherever the sulphur dioxide solution is to be used for preparing the solution in the field in a minimum of time and effort.

According to our method we employ liquid sulphur dioxide which is used directly for preparing the sulphur dioxide solution as needed directly in the tank or container in which the solution will be utilized. A single operator is enabled by our method to prepare large quantities of fresh solutions of sulphur dioxide in a minimum of time without any substantial losses of sulphur dioxide gas as occurs in previous methods.

In order that the invention may be more fully understood reference is made to the appended drawing in which 10 indicates a container or steel cylinder having liquefied sulphur dioxide and 12 is a reservoir provided with a gauge 14 for indicating the quantity of sulphur dioxide used. Cylinder 10 and reservoir 12 are connected by suitable piping 11 and T-connection 6. Valve 15 controls the amount of sulphur dioxide flowing through pipe 16 which is connected to the reservoir by T-connection 6. One end of pipe 16 has a discharge orifice 17 or other suitable opening connected in the water supply pipe line 18. Valve 20 controls the supply of water in pipe line 18. The orifice 17 is arranged as shown in the drawing so that the discharge end is within pipe line 18 and is aligned in the direction of travel of the water in pipe line 18. By means of valve 20 and 15 the proper amounts of water and liquid sulphur dioxide can be readily controlled for rapid and intimate mixing in order to give an aqueous solution of sulphur dioxide of the required strength which is supplied to tank 25 ready for use by a rubber hose 30. Tank 25 may, for example, contain fruits which are to be bleached with a definite concentration of sulphur dioxide solution. Solutions of sulphur dioxide can be made much more rapidly and efficiently than by the generally used method of introducing the gaseous sulphur dioxide into a stationary body of water by properly controlling and proportioning the speed and quantity of water which goes past the discharge orifice 17, and the rate and quantity of sulphur dioxide discharged from orifice 17. The heat necessary to convert the liquefied sulphur dioxide from its liquid state to its gaseous state is constantly and amply supplied by the controlled stream of water, and the volatilized sulphur dioxide gas is quickly dissolved by the water. The water, in giving up this heat, has its own temperature lowered which in turn makes it possible to hold more sulphur dioxide in solution since the solution of sulphur dioxide increases with lower temperatures of water.

If an attempt is made to add liquid sulphur dioxide directly to a stationary body of water, freezing of the water will result as it comes in contact with the liquid sulphur dioxide. It appears that the sulphur dioxide forms a hydrate which freezes and goes to the bottom. The hydrate melts at temperatures around 40 to 45° F. which is considerably higher than the melting point of ice. Consequently it is difficult to prepare a solution having uniform concentration by direct addition of liquid sulphur dioxide to water in a tank or receptacle, unless our method is used by slowly injecting the liquid sulphur dioxide at a regulated rate to a flowing controlled stream of water in suitably proportioned quantities.

Our method thus provides a very efficient and simple method of preparing solutions of sulphur dioxide with practically no loss of sulphur dioxide, discomfort to the operator and the necessity for the cumbersome equipment hitherto necessary. In addition to the great convenience offered by our method in making sulphur dioxide solutions, the cost of making same is greatly reduced as compared with previous methods for making these solutions. Our method furthermore makes it possible to make sulphur dioxide solutions of definite predetermined strength by definitely measuring the amounts of liquid sulphur dioxide which are added to a given quantity of water. By suitably calibrating our apparatus an untrained operator can prepare solutions of definite strength by merely observing the levels in the gauge and operating the valves in proper sequence. For this purpose the glass gauge 14 is calibrated for measuring a definite quantity of sulphur dioxide to be added to a definite quantity of water. In operating our apparatus the valve 9 of cylinder 10 and valves 8 and 13 are opened. Valve 15 is closed. The pressure in cylinder 10 will force liquid sulphur dioxide into reservoir 12, pressure being purged off through valve 19 if necessary, until the proper level is reached as shown on gauge 14. The valves 13 and 15 are then shut. Valve 20 is then opened for feeding a measured amount of water and valve 15 is opened. The pressure in reservoir 12 will force the liquid sulphur dioxide through orifice 17 where it will mix with the flowing stream of water in pipe line 18. When the lower marked level on gauge 14 is reached valve 15 is shut off and then valve 20 is shut thereby finishing the operation and giving the desired solution in tank 25. This operation is repeated as often as more solutions are needed.

It will be apparent that the apparatus needed for carrying out our invention is exceedingly simple. It is light in weight and can be readily set up to prepare solutions of sulphur dioxide wherever needed.

It is to be understood that modifications and changes may be made of an apparatus for carrying out our invention and it is to be understood that all such modifications are intended to be included within the scope of the appended claims.

We claim:

1. The method of preparing aqueous solutions of sulphur dioxide of predetermined strength which comprises forcing a stream of liquid sulphur dioxide through a nozzle into a pipe carrying a flowing stream of water surrounding said nozzle, absorbing the sulphur dioxide in said moving stream of water, regulating the flow of said streams to such quantities that no freezing occurs while forming an aqueous solution of sulphur dioxide.

2. The method of preparing aqueous solutions of sulphur dioxide of predetermined strength which comprises feeding a stream of liquid sulphur dioxide into a pipe carrying a flowing stream of water in such manner that said stream of sulphur dioxide is surrounded with water, absorbing the sulphur dioxide in said moving stream of water, regulating the flow of said streams to such quantities that no freezing occurs while forming an aqueous solution of sulphur dioxide.

3. The method of preparing aqueous solutions of sulphur dioxide of predetermined strength which comprises forcing a controlled stream of liquid sulphur dioxide through a nozzle into a pipe carrying a controlled flowing stream of water surrounding said nozzle, absorbing the sulphur dioxide in said moving stream of water, regulating the flow of said streams to such quantities that no freezing occurs while forming an aqueous solution of sulphur dioxide.

4. The method of preparing aqueous solutions of sulphur dioxide of predetermined strength which comprises forcing a stream of liquid sulphur dioxide through a nozzle into a pipe carrying a flowing stream of water surrounding said nozzle, feeding the said stream of liquid sulphur dioxide in the direction of travel of said stream of water, absorbing the sulphur dioxide in said moving stream of water, regulating the flow of streams to such quantities that no freezing occurs while forming an aqueous solutions of sulphur dioxide.

5. The method of preparing aqueous solutions of sulphur dioxide of predetermined strength which comprises slowly injecting at a regulated rate a stream of liquid sulphur dioxide through a nozzle into a pipe carrying a flowing stream of water surrounding said nozzle, absorbing the sulphur dioxide in said moving stream of water, regulating the flow of said streams to such quantities that no freezing occurs while forming an aqueous solution of sulphur dioxide.

ARTHUR C. POPE.
WALTER E. PFLEGER.